United States Patent
Fan et al.

(10) Patent No.: US 10,560,195 B2
(45) Date of Patent: Feb. 11, 2020

(54) BIAS CONTROL APPARATUS AND METHOD OF MODULATOR OF OPTICAL TRANSMITTER AND OPTICAL TRANSMITTER

(71) Applicant: FUJITSU LIMITED, Kawasaki-shi, Kanagawa (JP)

(72) Inventors: Yangyang Fan, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/940,169

(22) Filed: Mar. 29, 2018

(65) Prior Publication Data

US 2018/0287711 A1    Oct. 4, 2018

(30) Foreign Application Priority Data

Mar. 31, 2017   (CN) .......................... 2017 1 0207987

(51) Int. Cl.
| | |
|---|---|
| *H04B 10/50* | (2013.01) |
| *H04B 10/58* | (2013.01) |
| *G02F 1/21* | (2006.01) |
| *H04B 10/516* | (2013.01) |

(52) U.S. Cl.
CPC .............. *H04B 10/58* (2013.01); *G02F 1/21* (2013.01); *H04B 10/516* (2013.01); *G02F 2001/212* (2013.01); *H04B 10/50577* (2013.01)

(58) Field of Classification Search
None
See application file for complete search history.

(56) References Cited

U.S. PATENT DOCUMENTS

| | | | |
|---|---|---|---|
| 7,266,306 B1 * | 9/2007 | Harley | H04B 10/505 398/182 |
| 7,555,226 B2 * | 6/2009 | Tipper | G02F 1/0123 359/237 |

(Continued)

FOREIGN PATENT DOCUMENTS

| | | |
|---|---|---|
| CN | 103620988 | 3/2014 |
| CN | 105099544 | 11/2015 |

(Continued)

OTHER PUBLICATIONS

Cvijetic et al., Advanced Optical Communication Systems and Networks, 2013, Artech House, pp. 91-94 (Year: 2013).*

(Continued)

*Primary Examiner* — Kenneth N Vanderpuye
*Assistant Examiner* — Jai M Lee
(74) *Attorney, Agent, or Firm* — Staas & Halsey LLP (57) ABSTRACT

A bias control apparatus and method of a modulator of an optical transmitter and an optical transmitter, in which by performing mutual interference on driving signals of two Mach-Zehnder modulators constituting the modulator of the optical transmitter, output optical fields of the two Mach-Zehnder modulators are correlated. Hence, an output power signal of the modulator of the optical transmitter contains information on phase bias. Thus, the phase bias may be controlled by using the output power signal, sensitivity of the bias control may be efficiently improved, and various types of modulation formats may be applied.

12 Claims, 6 Drawing Sheets

(56) References Cited

U.S. PATENT DOCUMENTS

| | | | |
|---|---|---|---|
| 8,184,988 B2* | 5/2012 | Chen | H04B 10/548 398/183 |
| 8,396,336 B2* | 3/2013 | Kise | G02F 1/0121 385/1 |
| 8,532,499 B2* | 9/2013 | Caton | H04B 10/5051 359/245 |
| 8,977,119 B2* | 3/2015 | Yan | H04B 10/50575 398/185 |
| 2003/0058504 A1* | 3/2003 | Cho | H04B 10/2543 398/147 |
| 2006/0127102 A1* | 6/2006 | Roberts | H04B 10/505 398/182 |
| 2007/0133918 A1* | 6/2007 | Cho | G02F 1/225 385/1 |
| 2007/0212075 A1* | 9/2007 | Yin | G02F 1/0123 398/183 |
| 2008/0080872 A1 | 4/2008 | Tanaka et al. | |
| 2009/0092401 A1* | 4/2009 | Sekine | G02F 1/0123 398/185 |
| 2009/0115544 A1* | 5/2009 | Kershteyn | H04L 27/2075 332/103 |
| 2009/0252502 A1* | 10/2009 | Zhu | H04B 10/50572 398/188 |
| 2010/0266289 A1* | 10/2010 | Devgan | H04B 1/18 398/147 |
| 2012/0288284 A1* | 11/2012 | Yoshida | H04B 10/5053 398/186 |
| 2013/0155482 A1* | 6/2013 | Toya | G02F 1/01 359/279 |
| 2014/0308047 A1* | 10/2014 | Mak | H04B 10/5055 398/182 |
| 2015/0236790 A1* | 8/2015 | Guo | H04B 10/5053 398/25 |
| 2015/0318921 A1 | 11/2015 | Zhao et al. | |
| 2016/0282699 A1* | 9/2016 | Gottwald | H04B 10/50577 |
| 2018/0088359 A1* | 3/2018 | Shirakawa | H04B 10/50575 |
| 2018/0267340 A1* | 9/2018 | Rohde | G02F 1/0123 |

FOREIGN PATENT DOCUMENTS

| | | | |
|---|---|---|---|
| CN | 106031058 | 10/2016 | |
| WO | 2013/000511 | 1/2013 | |
| WO | WO-2013000511 A1 * | 1/2013 | H04B 10/5053 |

OTHER PUBLICATIONS

Deshpande, N.P., Electronic Devices and Circuits: Principles and Applications, 2007, Tata McGraw-Hill Company Limited, pp. 174-175 (Year: 2007).*

Medhi, Von Neumann Architecture, 2012, www2.cs.siu.edu/~cs401/Textbook/ch2.pdf (Year: 2012).*

Zhao et al., 40G QPSK and DQPSK Modulation, 2013, Inphi. (Year: 2013).*

Huang Ming-liu et al., "Research on Bias Control for Single-Side Modulation Based on DD-MZM", Study on Optical Communications, Aug. 2016, pp. 34-55.

* cited by examiner

FIG. 12 nsBIAS CONTROL APPARATUS AND METHOD OF MODULATOR OF OPTICAL TRANSMITTER AND OPTICAL TRANSMITTER

CROSS-REFERENCE TO RELATED APPLICATIONS

This application claims the benefit of Chinese Patent Application No. 201710207987.8, filed Mar. 31, 2017, in the Chinese Intellectual Property Office, the disclosure of which is incorporated herein by reference.

BACKGROUND

1. Field

This disclosure relates to the field of communications technologies, and in particular to a bias control apparatus and method of a modulator of an optical transmitter and an optical transmitter.

2. Description of the Related Art

In a high-speed optical communications system, it is generally needed to provide a modulator in an optical transmitter to modulate transmitted signals; wherein, in-phase and quadrature (IQ) modulators are widely used in optical communications systems to generate transmitted signals of high spectral efficiencies.

Figure 1:
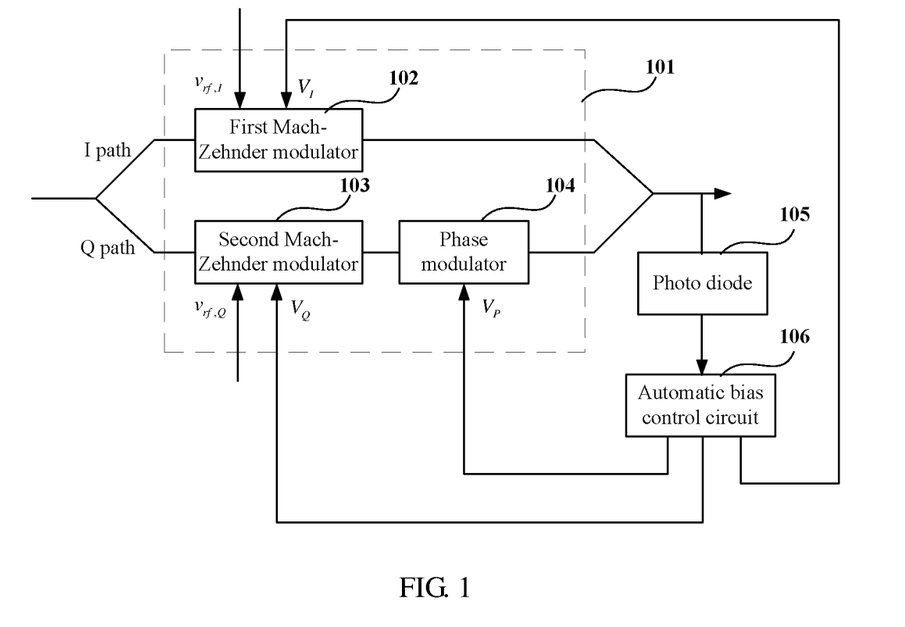
FIG. 1 is a schematic diagram of existing bias control on a modulator of an optical transmitter.

FIG. 1 is a schematic diagram of existing bias control on a modulator of an optical transmitter. As shown by a dotted box in FIG. 1, a modulator 101 of the optical transmitter has two push-pull Mach-Zehnder modulators (MZMs), respectively referred to as a first Mach-Zehnder modulator 102 and a second Mach-Zehnder modulator 103, and a phase modulator (PM) 104, the first Mach-Zehnder modulator 102 and the second Mach-Zehnder modulator 103 being respectively used for modulating driving signals $v_{rf,I}$ and $v_{rf,Q}$ of an I path and a Q path, and the phase modulator 104 introducing a phase difference of 90° between the I path and the Q path. In a normal operating state, the two Mach-Zehnder modulators 102 and 103 and the phase modulator 104 are all biased at respective optimal operating points. However, due to such factors as changes of ambient temperatures, and aging of devices, etc., drifts may possibly occur in all three bias points (denoted by bias I, bias Q, and bias P) of the modulators. Hence, the three bias points may deviate from the optimal operating points.

In order to ensure modulation performance of the modulators, an automatic bias control (ABC) circuit is usually used to respectively track and adjust the three bias points. As shown in FIG. 1, a photo diode (PD) 105 detects output power signals of the modulator 101 of the optical transmitter, and an automatic bias control circuit 106 controls bias voltages $V_I$, $V_Q$ and $V_P$ on the three bias points, bias I, bias Q, and bias P, of the modulators according to detecting results of the photo diode 105; for example, a method in which pilot perturbation is applied on a bias voltage may be used currently.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

Additional aspects and/or advantages will be set forth in part in the description which follows and, in part, will be apparent from the description, or may be learned by practice of the embodiments.

It was found by inventors that due to nonlinear modulation characteristics of a Mach-Zehnder modulator, a sensitivity of an existing automatic bias control circuit will be lowered as increase of a driving signal. Furthermore, after the pilot perturbation and transmitted signals are transmitted together, the pilot perturbation is hard to be removed at a receiver end. And for an optical fiber communications system adopting high-order modulation formats, a performance (Q factor) cost produced by the automatic bias control circuit, especially a performance cost produced by an automatic bias control circuit used for controlling bias P, will be increased to an extent that is unacceptable.

Embodiments of this disclosure provide a bias control apparatus and method of a modulator of an optical transmitter and an optical transmitter, in which by performing mutual interference on driving signals of two Mach-Zehnder modulators constituting the modulator of the optical transmitter, output optical fields of the two Mach-Zehnder modulators are correlated, hence, an output power signal of the modulator of the optical transmitter contains information on phase bias. Thus, the phase bias may be controlled by using the output power signal, sensitivity of the bias control may be efficiently improved, and various types of modulation formats may be applied.

According to a first aspect of the embodiments of this disclosure, there is provided a bias control apparatus of a modulator of an optical transmitter, the modulator of the optical transmitter including a first Mach-Zehnder modulator and a second Mach-Zehnder modulator, the apparatus including: a processing unit configured to perform mutual interference on a first driving signal of the first Mach-Zehnder modulator and a second driving signal of the second Mach-Zehnder modulator, so that output optical fields of the first Mach-Zehnder modulator and the second Mach-Zehnder modulator are correlated; and a controlling unit configured to control a phase bias of the modulator of the optical transmitter according to an output power signal of the modulator of the optical transmitter.

According to a second aspect of the embodiments of this disclosure, there is provided an optical transmitter, including the apparatus as described in the first aspect.

According to a third aspect of the embodiments of this disclosure, there is provided a bias control method of a modulator of an optical transmitter, the modulator of the optical transmitter including a first Mach-Zehnder modulator and a second Mach-Zehnder modulator, the method including: performing mutual interference on a first driving signal of the first Mach-Zehnder modulator and a second driving signal of the second Mach-Zehnder modulator, so that output optical fields of the first Mach-Zehnder modulator and the second Mach-Zehnder modulator are correlated; and controlling a phase bias of the modulator of the optical transmitter according to an output power signal of the modulator of the optical transmitter.

An advantage of the embodiments of this disclosure exists in that by performing mutual interference on driving signals of two Mach-Zehnder modulators constituting the modulator of the optical transmitter, output optical fields of the two Mach-Zehnder modulators are correlated, hence, an output power signal of the modulator of the optical transmitter contains information on phase bias. Thus, the phase bias may be controlled by using the output power signal, sensitivity of the bias control may be efficiently improved, and various types of modulation formats may be applied.

With reference to the following description and drawings, the particular embodiments of this disclosure are disclosed in detail, and principles of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

The drawings are included to provide further understanding of the embodiments, which constitute a part of the specification and illustrate the preferred embodiments, and are used for setting forth the principles of the present disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

Reference will now be made in detail to the embodiments, examples of which are illustrated in the accompanying drawings, wherein like reference numerals refer to the like elements throughout. The embodiments are described below by referring to the figures.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

These and further aspects and features of the embodiments will be apparent with reference to the following description and attached drawings. In the description and drawings, particular embodiments have been disclosed in detail as being indicative of some of the ways in which the principles of the embodiments may be employed, but it is understood that the embodiments are not limited correspondingly in scope. Rather, the embodiments include all changes, modifications and equivalents coming within the terms of the appended claims.

Embodiment 1

Figure 2:
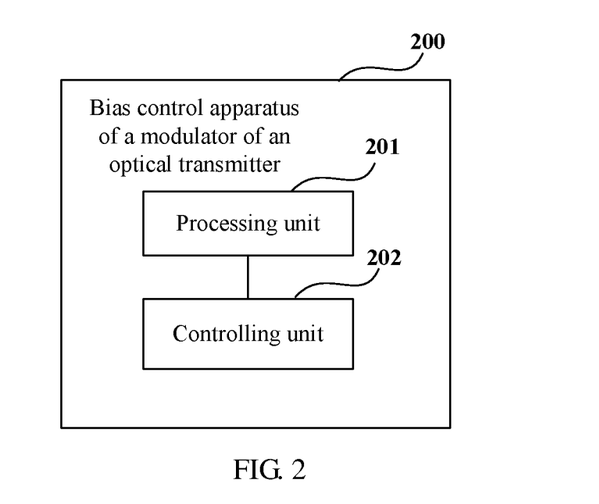
FIG. 2 is a schematic diagram of the bias control apparatus of a modulator of an optical transmitter of Embodiment 1 of this disclosure.

FIG. 2 is a schematic diagram of the bias control apparatus of a modulator of an optical transmitter of Embodiment 1 of this disclosure, the modulator of the optical transmitter including a first Mach-Zehnder modulator and a second Mach-Zehnder modulator. As shown in FIG. 2, the apparatus 200 includes:

a processing unit 201 configured to perform mutual interference on a first driving signal of the first Mach-Zehnder modulator and a second driving signal of the second Mach-Zehnder modulator, so that output optical fields of the first Mach-Zehnder modulator and the second Mach-Zehnder modulator are correlated; and a controlling unit 202 configured to control a phase bias of the modulator of the optical transmitter according to an output power signal of the modulator of the optical transmitter.

It can be seen from the above embodiment that by performing mutual interference on driving signals of two Mach-Zehnder modulators constituting the modulator of the optical transmitter, output optical fields of the two Mach-Zehnder modulators are correlated, hence, an output power signal of the modulator of the optical transmitter contains information on phase bias. Thus, the phase bias may be controlled by using the output power signal, sensitivity of the bias control may be efficiently improved, and various types of modulation formats may be applied.

In this embodiment, the modulator of the optical transmitter includes a first Mach-Zehnder modulator and a second Mach-Zehnder modulator. And an existing structure may be used for the modulator of the optical transmitter, for example, a structure identical that of the modulator 101 of the optical transmitter may be used.

Figure 3:
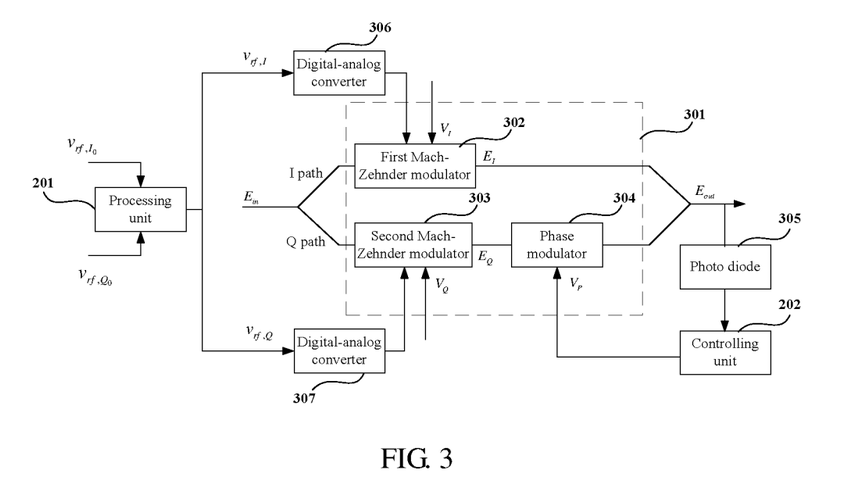
FIG. 3 is a schematic diagram of performing bias control on the modulator of the optical transmitter of Embodiment 1 of this disclosure.

FIG. 3 is a schematic diagram of performing bias control on the modulator of the optical transmitter of Embodiment 1 of this disclosure. As shown in FIG. 3, a modulator 301 of the optical transmitter includes a first Mach-Zehnder modulator 302 and a second Mach-Zehnder modulator 303, and a phase modulator 304. The first Mach-Zehnder modulator 302 is used to modulate transmitted signals of an I path, the second Mach-Zehnder modulator 303 is used to modulate transmitted signals of a Q path, a first driving signal $V_{rf,I_0}$ and a second driving signal $v_{rf,Q_0}$ being respectively used for driving the first Mach-Zehnder modulator 302 and the second Mach-Zehnder modulator 303, and the phase modulator 304 introduces a phase difference of 90° between the I path and the Q path. The processing unit 201 performs mutual interference on the first driving signal $v_{rf,Q_0}$ of the first Mach-Zehnder modulator 302 and the second driving signal $v_{rf,Q_0}$ of the second Mach-Zehnder modulator 303, so as to obtain a first driving signal $v_{rf,I}$ performed mutual interference and a second driving signal $v_{rf,Q}$ performed mutual interference, which are respectively converted into analog driving signals by digital-analog converters 306 and 307, and respectively drive the first Mach-Zehnder modulator 302 and the second Mach-Zehnder modulator 303. A photo diode 305 detects an output power signal of the modulator 301 of the optical transmitter, and the controlling unit 202 controls a phase bias of the modulator of the optical transmitter according to the output power signal, that is, controlling a bias voltage $V_P$ on a bias point P on the phase modulator 304. The relevant art may be used for controlling bias voltages $V_I$ and $V_P$.

As shown in FIG. 3, an input optical field of the modulator 301 of the optical transmitter is $E_{in}$, an output optical field of the first Mach-Zehnder modulator 302 is $E_I$, and an output optical field of the second Mach-Zehnder modulator is $E_Q$. For example, an output optical field $E_{out}$ of the modulator 301 of the optical transmitter may be expressed as:

$$E_{out} = E_I + je^{j\Delta\theta_P}E_Q \quad (1);$$

where, $E_{out}$ denotes the output optical field of the modulator of the optical transmitter, $E_I$ denotes the output optical field of the first Mach-Zehnder modulator, $E_Q$ denotes the output optical field of the second Mach-Zehnder modulator, and $\Delta\theta_P$ denotes an offset of the bias point P on the phase modulator relative to 90°.

A corresponding output power signal may be obtained according to the output optical field of the modulator 301 of the optical transmitter. For example, following formula (2) may be used to express the output power signal:

$$P_{out} = |E_{out}|^2 \quad (2);$$

where, $P_{out}$ denotes the output power signal of the modulator of the optical transmitter, and $E_{out}$ denotes the output optical field of the modulator of the optical transmitter.

The output power signal may be expressed by combining the above formulae (1) and (2) according to following formula (3):

$$P_{out} = |E_I|^2 + |E_Q|^2 - 2E_I E_Q \sin(\Delta\theta_P) \quad (3);$$

where, $P_{out}$ denotes the output power signal of the modulator of the optical transmitter, $E_I$ denotes the output optical field of the first Mach-Zehnder modulator, $E_Q$ denotes the output optical field of the second Mach-Zehnder modulator, and $\Delta\theta_P$ denotes the offset of the bias point P on the phase modulator relative to 90°, i.e., a drift of the phase bias.

In above formula (3), only the right third item, $-2E_I E_Q \sin(\Delta\theta_P)$, is correlated to the offset $\Delta\theta_P$ of the bias P. In normal cases, as the mean value of the output optical fields $E_I$ and $E_Q$ is zero and they are independent of each other, the mean value of the item $-2E_I E_Q \sin(\Delta\theta_P)$ is also zero, and mean power $E(P_{out})$ outputted by the modulator of the optical transmitter is not correlated to the bias P.

In this embodiment, by performing mutual interference on the first driving signal $v_{rf,I_0}$ of the first Mach-Zehnder modulator 302 and the second driving signal $v_{rf,Q_0}$ of the second Mach-Zehnder modulator 303 by the processing unit 201, the output optical fields $E_I$ and $E_Q$ of the first Mach-Zehnder modulator 302 and the second Mach-Zehnder modulator 303 are made correlated, and the mean value of the right third item, $-2E_I E_Q \sin(\Delta\theta_P)$, is not zero.

Hence, the mean power $E(P_{out})$ obtained from the output power signal $P_{out}$ is correlated to the offset $\Delta\theta_P$ of the bias P, and the phase bias (bias P) of the modulator of the optical transmitter may be controlled according to the mean power $E(P_{out})$.

In this embodiment, the processing unit 201 may perform mutual interference on the first driving signal of the first Mach-Zehnder modulator and the second driving signal of the second Mach-Zehnder modulator by using various methods, so that the output optical fields of the first Mach-Zehnder modulator and the second Mach-Zehnder modulator are correlated.

A method for performing mutual interference by the processing unit 201 shall be illustrated below.

For example, the processing unit 201 may perform mutual interference by adding information on the second driving signal to the first driving signal via a loading signal and by adding information on the first driving signal to the second driving signal via the loading signal.

For example, the processing unit 201 may perform mutual interference on the first driving signal and the second driving signal according to formula (4) below:

$$\begin{cases} v_{rf,I} = v_{rf,I_0} + d(t) * u_{Q_0} \\ v_{rf,Q} = v_{rf,Q_0} + d(t) * u_{I_0} \end{cases} \quad (4)$$

where, $v_{rf,I}$ denotes the first driving signal performed mutual interference, $v_{rf,Q}$ denotes the second driving signal performed mutual interference, $v_{rf,I_0}$ denotes the first driving signal before the mutual interference is performed, $v_{rf,Q_0}$ denotes the second driving signal before the mutual interference is performed, $d(t)$ denotes the loading signal, $u_{Q_0}$ denotes the information on the second driving signal, and $u_{I_0}$ denotes the information on the first driving signal.

Figure 4:
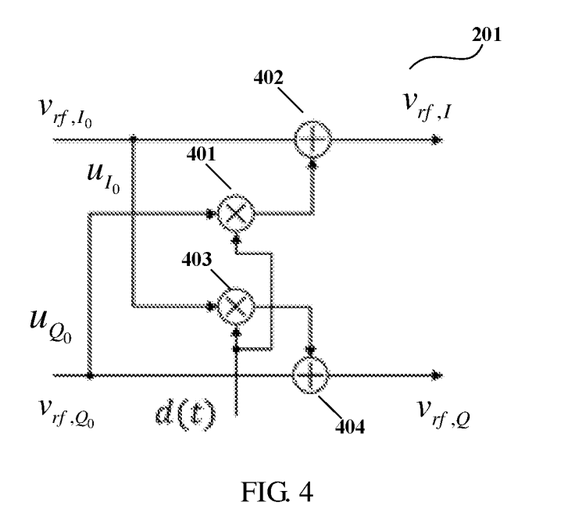
FIG. 4 is a schematic diagram of the processing unit 201 of Embodiment 1 of this disclosure.

FIG. 4 is a schematic diagram of the processing unit 201 of Embodiment 1 of this disclosure. As shown in FIG. 4, the processing unit 201 includes:

a first multiplication unit 401 configured to multiply the loading signal $d(t)$ by the information u on the second driving signal;

a first addition unit 402 configured to add up a result of multiplication of the first multiplication unit 401 and the first driving signal $v_{rf,I_0}$ to obtain the first driving signal $v_{rf,I}$ performed mutual interference;

a second multiplication unit 403 configured to multiply the loading signal $d(t)$ by the information $u_{I_0}$ on the first driving signal; and a second addition unit 404 configured to add up a result of multiplication of the second multiplication unit 403 and the second driving signal $v_{rf,Q_0}$ to obtain the second driving signal $v_{rf,Q}$ performed mutual interference.

In this embodiment, the information on the first driving signal and the information on the second driving signal may be various information on the first driving signal and the second driving signal. For example, the information may be the first driving signal and the second driving signal themselves, or may be symbols (signs) of the first driving signal and the second driving signal.

For example, the first multiplication unit 401 multiplies the loading signal by the second driving signal, and the second multiplication unit 403 multiplies the loading signal by the first driving signal, or the first multiplication unit 401 multiplies the loading signal by the symbol of the second driving signal, and the second multiplication unit 403 multiplies the loading signal by the symbol of the first driving signal.

In this embodiment, it may also be that the loading signal is not multiplied by the driving signals. For example, shift operations may be performed on the driving signals according to the loading signal.

Figure 5:
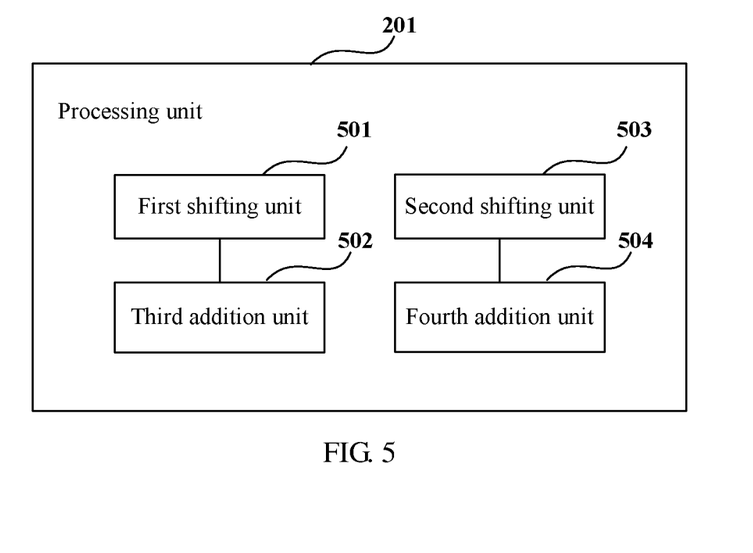
FIG. 5 is another schematic diagram of the processing unit 201 of Embodiment 1 of this disclosure.

FIG. 5 is another schematic diagram of the processing unit 201 of Embodiment 1 of this disclosure. As shown in FIG. 5, the processing unit 201 includes:

a first shifting unit 501 configured to perform first shift operation on the second driving signal $v_{rf,I_0}$ according to the loading signal d(t);

a third addition unit 502 configured to add up a result of the first shift operation and the first driving signal $v_{rf,I_0}$ to obtain a first driving signal $v_{rf,I}$ performed mutual interference;

a second shifting unit 503 configured to perform second shift operation on the first driving signal $v_{rf,I_0}$ according to the loading signal d(t); and a fourth addition unit 504 configured to add up a result of the second shift operation and the second driving signal $v_{rf,Q_0}$ to obtain a second driving signal $v_{rf,Q}$ performed mutual interference.

In this embodiment, the first shifting unit 501 performs first shift operation on the second driving signal $v_{rf,Q_0}$ according to the loading signal d(t), and the second shifting unit 503 performs second shift operation on the first driving signal $v_{rf,I_0}$ according to the loading signal d(t). For example, when the first driving signal $v_{rf,I_0}$ and the second driving signal $v_{rf,I_0}$ are digital signals, and an amplitude of the loading signal d(t) is $\frac{1}{2^n}$, n being a positive integer, decimal points of the first driving signal $v_{rf,I_0}$ and the second driving signal $v_{rf,Q_0}$ may be shifted leftwards by n digits.

In this way, by replacing the multiplication operation with the shifting operation, computational complexity can be lowered, and the operation speed can be increased.

In this embodiment, the loading signal is used for loading information on the other driving signal, which may be signals of various forms. For example, the loading signal is a low-frequency pulse. For example, the loading signal is a square wave signal or a sine wave signal.

In this embodiment, a frequency of the loading signal may be set to be much less than a bandwidth of the transmitted signal, and its amplitude $|d(t)|=\varepsilon \ll 1$; for example, the frequency and amplitude of the loading signal may be determined according to a system cost caused by the mutual interference processing and a performance requirement of automatic bias control.

The mutual interference processing of this embodiment shall be illustrated below by taking that the loading signal d(t) is a square wave signal and the information on the first driving signal and the information on the second driving signal are the first driving signal and the second driving signal themselves an example.

According to the above formula (4), the output optical fields of the first Mach-Zehnder modulator and the second Mach-Zehnder modulator may be expressed by formula (5) below:

$$\begin{cases} E_I \propto v_{rf,I_0} + d(t) * v_{rf,Q_0} \\ E_Q \propto v_{rf,Q_0} + d(t) * v_{rf,I_0} \end{cases} ; \quad (5)$$

where, $E_I$ denotes the output optical field of the first Mach-Zehnder modulator, $E_Q$ denotes the output optical field of the second Mach-Zehnder modulator, the symbol "∝" denotes being in proportion, $v_{rf,I_0}$ denotes the first driving signal before the mutual interference is performed, $v_{rf,Q_0}$ denotes the second driving signal before the mutual interference is performed, d(t) denotes the loading signal, $u_{Q_0}$ denotes the information on the second driving signal, and $u_{I_0}$ denotes the information on the first driving signal.

Formula (5) is substituted into the above formula (3), and formula (6) below is obtained:

$$P_{out} \propto (1 + d^2(t))(v_{rf,I_0}^2 + v_{rf,Q_0}^2) + 4d(t) * v_{rf,I_0} v_{rf,Q_0} - \qquad (6)$$
$$2[(1 + d^2(t)) v_{rf,I_0} v_{rf,Q_0} + d(t)(v_{rf,I_0}^2 + v_{rf,Q_0}^2)] \sin(\Delta\theta_P);$$

where, $P_{out}$ denotes the output power signal of the modulator of the optical transmitter, $\Delta\theta_P$ denotes the offset of the bias point P on the phase modulator relative to 90°, $v_{rf,I_0}$ denotes the first driving signal before the mutual interference is performed, $v_{rf,Q_0}$ denotes the second driving signal before the mutual interference is performed, and d(t) denotes the loading signal.

According to statistical characteristics that $v_{rf,I_0}$ and $v_{rf,Q_0}$ are of mean values of zero and are independent of each other, for the sake of convenience of description, the output power signal is averaged within a half of a square wave period to obtain mean power correlated to the phase bias, which may be expressed by using formula (7) below:

$$E(P_{out}) \propto [E(v_{rf,I_0}^2) + E(v_{rf,Q_0}^2)] * [1 + E(d^2(t))] - \qquad (7)$$
$$2[E(v_{rf,I_0}^2) + E(v_{rf,Q_0}^2)] * E(d(t)) * \sin(\Delta\theta_P);$$

where, $E(P_{out})$ denotes the output mean power of the modulator of the optical transmitter, $\Delta\theta_P$ denotes the offset of the bias point P on the phase modulator relative to 90°, $v_{rf,I_0}$ denotes the first driving signal before the mutual interference is performed, $v_{rf,Q_0}$ denotes the second driving signal before the mutual interference is performed, and d(t) denotes the loading signal.

Figure 6:
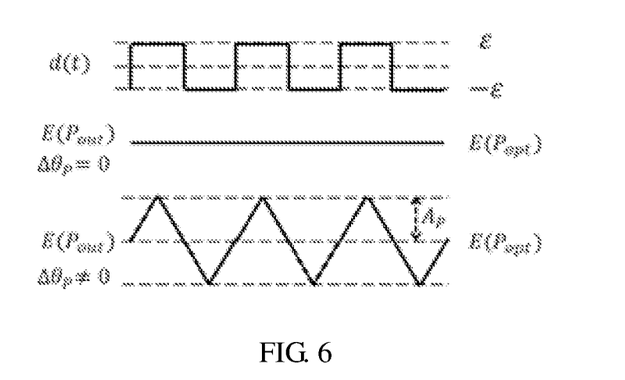
FIG. 6 is a schematic diagram of mean power outputted by the modulator of the optical transmitter of Embodiment 1 of this disclosure.

FIG. 6 is a schematic diagram of the mean power outputted by the modulator of the optical transmitter of Embodiment 1 of this disclosure. As shown in FIG. 6, the amplitude of the loading signal d(t) is ε, and when the phase bias (bias P) is at the optimal bias point, $\Delta\theta_P=0$, the optical power signal $P_{out}$ at this moment is marked by $P_{opt}$, and the mean power $E(P_{opt})$ is not changed along with the time; and when the phase bias (bias P) is drifted, $\Delta\theta_P \neq 0$, the mean power $E(P_{opt})$ at this moment appears as a triangular wave signal, an amplitude $A_P$ of the triangular wave signal being in proportion to a sinusoidal function of the phase bias drift $\Delta\theta_P$, and the mean power $E(P_{opt})$ and the amplitude $A_P$ may be expressed by using formulae (8) and (9) below:

$$E(P_{out}) \propto (1+\varepsilon^2) * [E(v_{rf,I_0}^2) + E(v_{rf,Q_0}^2)] \qquad (8),$$

$$A_P \propto \varepsilon * [E(v_{rf,I_0}^2) + E(v_{rf,Q_0}^2)] * |\sin(\Delta\theta_P)| \qquad (9);$$

where, $E(P_{opt})$ denotes the mean power outputted by the modulator of the optical transmitter, $\Delta\theta_P$ denotes the offset of the bias point P on the phase modulator relative to 90°, $v_{rf,I_0}$ denotes the first driving signal before the mutual interference is performed, $v_{rf,Q_0}$ denotes the second driving signal before the mutual interference is performed, ε denotes the amplitude of the loading signal, and $A_p$ denotes the amplitude of the triangular wave signal of the mean power $E(P_{opt})$.

The method for performing mutual interference processing by the processing unit 201 and the output power signal of the modulator of the optical transmitter after the mutual interference processing are illustrated above.

In this embodiment, the controlling unit 202 controls the phase bias of the modulator of the optical transmitter according to the output power signal of the modulator of the optical transmitter, such as controlling the phase bias according to the mean power obtained from the output power signal.

For example, according to the above formulae (8) and (9), the phase bias may be controlled according to the characteristic that the amplitude $A_p$ of the mean power $E(P_{opt})$ is in proportion to the sinusoidal function of the phase bias drift $\Delta\theta_P$.

In this embodiment, the controlling unit 202 may control the phase bias by using various methods. For example, it may be based on a peak value or mean square value detection method, or a phase synchronization detection method.

Figure 7:
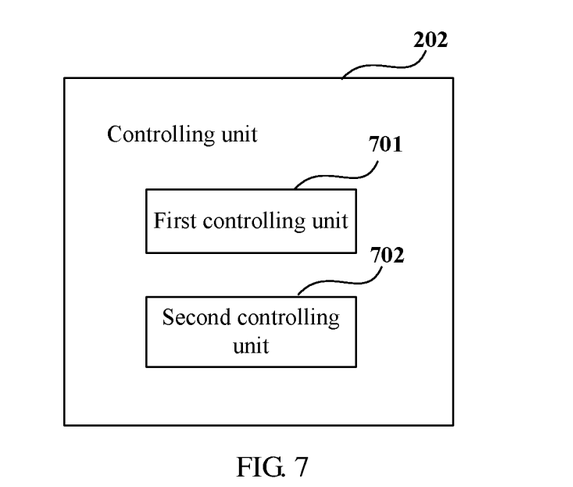
FIG. 7 is a schematic diagram of the controlling unit 202 of Embodiment 1 of this disclosure.

FIG. 7 is a schematic diagram of the controlling unit 202 of Embodiment 1 of this disclosure. As shown in FIG. 7, the controlling unit 202 includes:

a first controlling unit 701 configured to control the phase bias of the modulator of the optical transmitter according to the output power signal of the modulator of the optical transmitter and based on a peak value or mean square value detection method; or a second controlling unit 702 configured to control the phase bias of the modulator of the optical transmitter according to the output power signal of the modulator of the optical transmitter and based on a phase synchronization detection method.

Structures and controlling methods of the first controlling unit 701 and the second controlling unit 702 shall be illustrated below.

Figure 8:
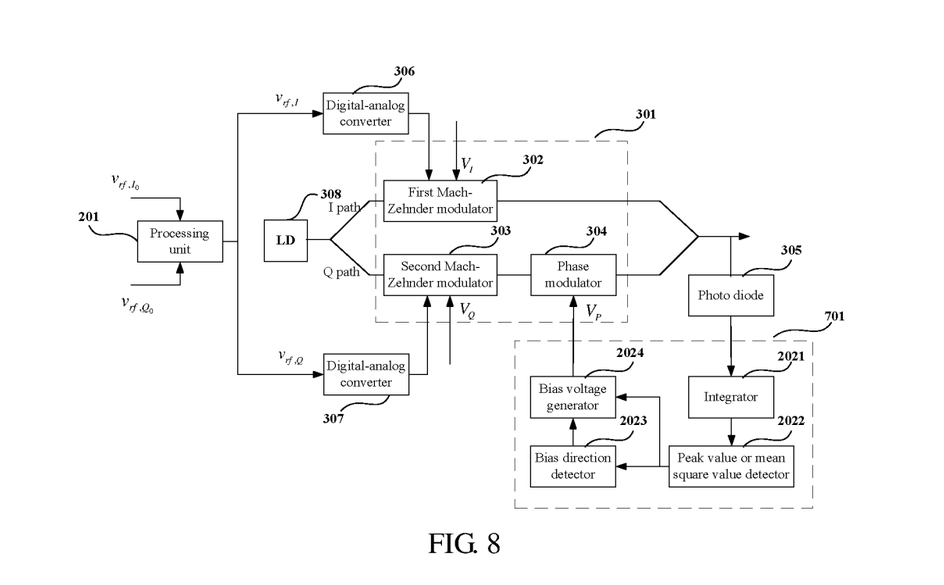
FIG. 8 is a schematic diagram of performing phase bias control based on a peak value or mean square value detection method of Embodiment 1 of this disclosure.

FIG. 8 is a schematic diagram of performing phase bias control based on a peak value or mean square value detection method of Embodiment 1 of this disclosure. As shown in FIG. 8, identical to the structure shown in FIG. 3, the modulator 301 of the optical transmitter includes the first Mach-Zehnder modulator 302 and the second Mach-Zehnder modulator 303, and the phase modulator 304. The first driving signal $v_{rf,I}$ performed mutual interference and the second driving signal $v_{rf,Q}$ performed mutual interference are obtained after processing by the processing unit 201, which are respectively converted into analog driving signals by the digital-analog converters 306 and 307, and respectively drive the first Mach-Zehnder modulator 302 and the second Mach-Zehnder modulator 303. A laser emitted by a laser LD 308 is inputted into the modulator 301 of the optical transmitter, the photo diode 305 detects the output power signal of the modulator 301 of the optical transmitter, and the first controlling unit 701 controls the phase bias of the modulator 301 of the optical transmitter according to the output power signal.

As shown in FIG. 8, the first controlling unit 701 includes an integrator 2021, a peak value or mean square value detector 2022, a bias direction detector 2023 and a bias voltage generator 2024. For example, the integrator 2021 outputs a mean power signal, and its integration time is not in excess of a half of a low-frequency pulse period and is much larger than a symbol period of a transmitted signal; the peak value or mean square value detector 2022 obtains a peak-to-peak variation value or a root mean square value of an input signal, which consists of an AC coupler and a power detector, the power detector being able to obtain a phase bias error; the bias direction detector 2023 is used to judge a direction of a phase bias drift; for example, judgment is performed according to an adjusting direction of a phase bias voltage $V_P$ at last time and a relative relationship between detecting errors in a current cycle and a last cycle; wherein, the phase bias voltage $V_P$ is adjusted in an increasing direction when reduction of the phase bias voltage $V_P$ in the last cycle causes an increase in an error detected currently, and the phase bias voltage $V_P$ is adjusted in a decreasing direction when the error decreases; and finally, the bias voltage generator 2024 adjusts the phase bias voltage $V_P$ at a step or proportion according to a size and direction of the drift, so as to approach an optimal bias value.

In this embodiment, existing structures may be used for the integrator 2021, the peak value or mean square value detector 2022, the bias direction detector 2023 and the bias voltage generator 2024. And furthermore, the relevant art may be used for controlling the bias voltages $V_I$ and $V_Q$.

Figure 9:
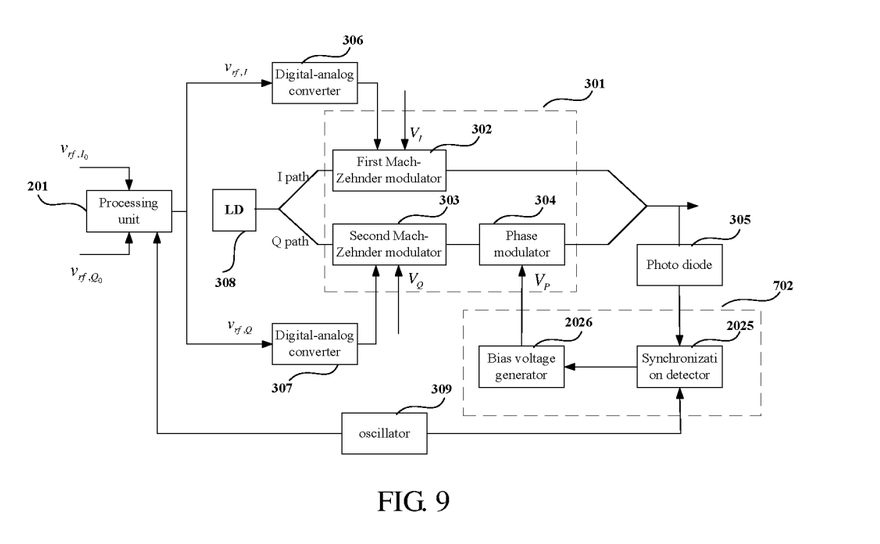
FIG. 9 is a schematic diagram of performing phase bias control based on a phase synchronization detection method of Embodiment 1 of this disclosure.

FIG. 9 is a schematic diagram of performing phase bias control based on a phase synchronization detection method of Embodiment 1 of this disclosure, with structures identical to those in FIGS. 8 and 3 shall not be described herein any further. As shown in FIG. 9, the second controlling unit 702 includes a synchronization detector 2025 and a bias voltage generator 2026. Furthermore, a reference signal of the synchronization detector 2025 and the loading signal $d(t)$ used by the processing unit 201 are kept in synchronization by an oscillator 309. The output power signal of the modulator 301 of the optical transmitter detected by the photo diode 305 is directly inputted into the synchronization detector 2025. The phase bias error synchronously detected by the synchronization detector 2025 contains the size and direction of the offset of the phase bias, which are directly inputted into the bias voltage generator 2026, so as to adjust the phase bias voltage $V_P$ to approach an optimal bias value.

In this embodiment, existing structures may be used for the synchronization detector 2025 and the bias voltage generator 2026. And furthermore, the relevant art may be used for controlling the bias voltages $V_I$ and $V_Q$.

It can be seen from the above embodiment that by performing mutual interference on driving signals of two Mach-Zehnder modulators constituting the modulator of the optical transmitter, output optical fields of the two Mach-Zehnder modulators are correlated, hence, an output power signal of the modulator of the optical transmitter contains information on phase bias. Thus, the phase bias may be controlled by using the output power signal, sensitivity of the bias control may be efficiently improved, and various types of modulation formats may be applied.

Embodiment 2

Figure 10:
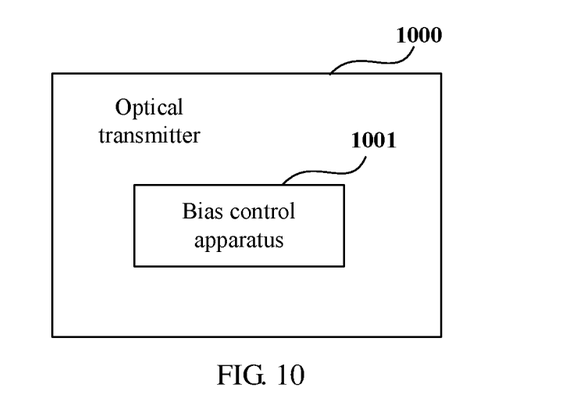
FIG. 10 is a schematic diagram of a structure of the optical transmitter of Embodiment 2 of this disclosure.

The embodiment of this disclosure further provides an optical transmitter. FIG. 10 is a schematic diagram of a structure of the optical transmitter of Embodiment 2 of this disclosure. As shown in FIG. 10, an optical transmitter 1000 includes a bias control apparatus 1001, a structure and functions of the bias control apparatus 1001 being identical to those contained in Embodiment 1, and shall not be described herein any further.

Figure 11:
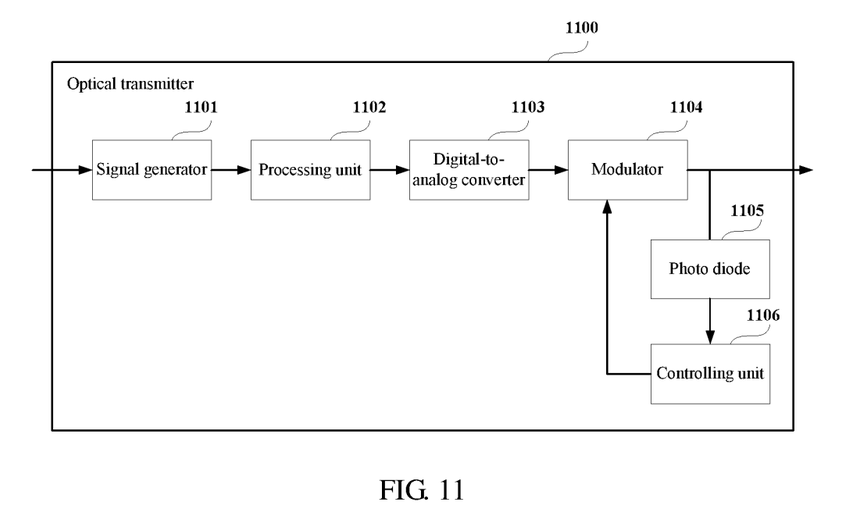
FIG. 11 is a block diagram of a systematic structure of the optical transmitter of Embodiment 2 of this disclosure.

FIG. 11 is a block diagram of a systematic structure of the optical transmitter of Embodiment 2 of this disclosure. As shown in FIG. 11, the optical transmitter 1100 includes a signal generator 1101, a processing unit 1102, a digital-to-analog converter 1103, a modulator 1104, a photo diode 1105 and a controlling unit 1106; wherein, the signal generator 1101 generates digital signals of two paths according to transmitted data, and takes the signals as driving signals for an I path and a Q path of the modulator 1104; the processing unit 1102 performs mutual interference on the driving signals for the I path and the Q path of the modulator 1104; the digital-to-analog converter 1103 performs digital-to-analog conversion on the mutual interference processed driving signals for the I path and the Q path; the modulator 1104 modulates light according to the driving signals; the photo diode 1105 detects an output power signal of the modulator 1104; and the controlling unit 1106 controls phase bias of the modulator 1104 according to the output power signal.

In this embodiment, the relevant art may be referred to for structures of the signal generator 1101, the digital-to-analog converter 1103, the modulator 1104 and the photo diode 1105, and structures and functions of the processing unit 1102 and the controlling unit 1106 are identical to those contained in Embodiment 1, and shall not be described herein any further. And furthermore, the processing unit 1102 and the controlling unit 1106 may be integrated into a digital signal processor of the optical transmitter, that is, the functions of the processing unit 1102 and the controlling unit 1106 are carried out by the digital signal processor. For example, the digital signal processor may be configured to: perform mutual interference on a first driving signal of the first Mach-Zehnder modulator and a second driving signal of the second Mach-Zehnder modulator, so that output optical fields of the first Mach-Zehnder modulator and the second Mach-Zehnder modulator are correlated; and control a phase bias of the modulator of the optical transmitter according to an output power signal of the modulator of the optical transmitter.

In this embodiment, the optical transmitter 1100 does not necessarily include all the components shown in FIG. 11; and furthermore, the optical transmitter 1100 may include components not shown in FIG. 11, and the relevant art may be referred to.

It can be seen from the above embodiment that by performing mutual interference on driving signals of two Mach-Zehnder modulators constituting the modulator of the optical transmitter, output optical fields of the two Mach-Zehnder modulators are correlated, hence, an output power signal of the modulator of the optical transmitter contains information on phase bias. Thus, the phase bias may be controlled by using the output power signal, sensitivity of the bias control may be efficiently improved, and various types of modulation formats may be applied.

Embodiment 3

The embodiment of this disclosure further provides a bias control method of a modulator of an optical transmitter, corresponding to the bias control apparatus of a modulator of an optical transmitter in Embodiment 1.

Figure 12:
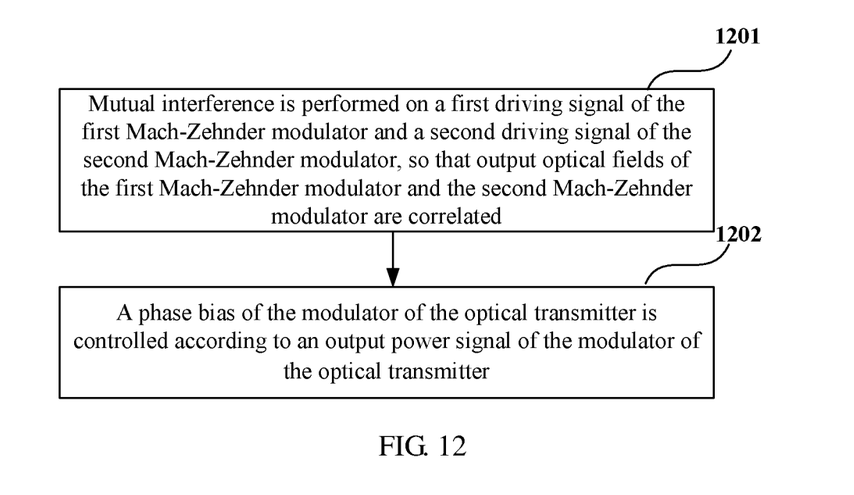
FIG. 12 is a schematic diagram of the bias control method of a modulator of an optical transmitter of Embodiment 3 of this disclosure.

FIG. 12 is a schematic diagram of the bias control method of a modulator of an optical transmitter of Embodiment 3 of this disclosure, the modulator of the optical transmitter including a first Mach-Zehnder modulator and a second Mach-Zehnder modulator. As shown in FIG. 12, the method includes:

Step 1201: mutual interference is performed on a first driving signal of the first Mach-Zehnder modulator and a second driving signal of the second Mach-Zehnder modulator, so that output optical fields of the first Mach-Zehnder modulator and the second Mach-Zehnder modulator are correlated; and Step 1202: a phase bias of the modulator of the optical transmitter is controlled according to an output power signal of the modulator of the optical transmitter.

In this embodiment, methods for carrying out the above steps are identical to those contained in Embodiment 1, which shall not be described herein any further.

It can be seen from the above embodiment that by performing mutual interference on driving signals of two Mach-Zehnder modulators constituting the modulator of the optical transmitter, output optical fields of the two Mach-Zehnder modulators are correlated, hence, an output power signal of the modulator of the optical transmitter contains information on phase bias. Thus, the phase bias may be controlled by using the output power signal, sensitivity of the bias control may be efficiently improved, and various types of modulation formats may be applied.

An embodiment of the present disclosure provides a computer readable program, which, when executed in a bias control apparatus of a modulator of an optical transmitter or an optical transmitter, will cause the computer to carry out the bias control method of a modulator of an optical transmitter as described in Embodiment 3 in the bias control apparatus of a modulator of an optical transmitter or the optical transmitter.

An embodiment of the present disclosure provides a computer storage medium, including a computer readable program, which will cause the computer to carry out the bias control method of a modulator of an optical transmitter as described in Embodiment 3 in a bias control apparatus of a modulator of an optical transmitter or an optical transmitter.

The bias control method carried out in the bias control apparatus of a modulator of an optical transmitter or the optical transmitter described with reference to the embodiments of this disclosure may be directly embodied as hardware, software modules executed by a processor, or a combination thereof. For example, one or more functional block diagrams and/or one or more combinations of the functional block diagrams shown in FIG. 2 may either correspond to software modules of procedures of a computer program, or correspond to hardware modules. Such software modules may respectively correspond to the steps shown in FIG. 12. And the hardware module, for example, may be carried out by firming the soft modules by using a field programmable gate array (FPGA).

The soft modules may be located in an RAM, a flash memory, an ROM, an EPROM, and an EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 2 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 2 may also be realized as a combination of computing equipment, such as a combination of a DSP and a microprocessor, multiple processors, one or more microprocessors in communications combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principles of the present disclosure, and such variants and modifications fall within the scope of the present disclosure.

For implementations the above embodiments, following supplements are further disclosed.

Supplement 1. A bias control apparatus of a modulator of an optical transmitter, the modulator of the optical transmitter including a first Mach-Zehnder modulator and a second Mach-Zehnder modulator, the apparatus including:

a processing unit configured to perform mutual interference on a first driving signal of the first Mach-Zehnder modulator and a second driving signal of the second Mach-Zehnder modulator, so that output optical fields of the first Mach-Zehnder modulator and the second Mach-Zehnder modulator are correlated; and a controlling unit configured to control a phase bias of the modulator of the optical transmitter according to an output power signal of the modulator of the optical transmitter.

Supplement 2. The apparatus according to supplement 1, wherein the processing unit is configured to perform mutual interference by adding information on the second driving signal to the first driving signal via a loading signal and by adding information on the first driving signal to the second driving signal via the loading signal.

Supplement 3. The apparatus according to supplement 2, wherein the processing unit includes:

a first multiplication unit configured to multiply the loading signal by the information on the second driving signal;

a first addition unit configured to add up a result of multiplication of the first multiplication unit and the first driving signal to obtain a first driving signal performed mutual interference;

a second multiplication unit configured to multiply the loading signal by the information on the first driving signal; and a second addition unit configured to add up a result of multiplication of the second multiplication unit and the second driving signal to obtain a second driving signal performed mutual interference.

Supplement 4. The apparatus according to supplement 2, wherein the processing unit includes:

a first shifting unit configured to perform first shift operation on the second driving signal according to the loading signal;

a third addition unit configured to add up a result of the first shift operation and the first driving signal to obtain a first driving signal performed mutual interference;

a second shifting unit configured to perform second shift operation on the first driving signal according to the loading signal; and a fourth addition unit configured to add up a result of the second shift operation and the second driving signal to obtain a second driving signal performed mutual interference.

Supplement 5. The apparatus according to supplement 2, wherein the information on the first driving signal and the information on the second driving signal are the first driving signal and the second driving signal, or symbols of the first driving signal and symbols of the second driving signal.

Supplement 6. The apparatus according to supplement 1, wherein the controlling unit includes:

a first controlling unit configured to control the phase bias of the modulator of the optical transmitter according to the output power signal of the modulator of the optical transmitter and based on a peak value or mean square value detection method; or a second controlling unit configured to control the phase bias of the modulator of the optical transmitter according to the output power signal of the modulator of the optical transmitter and based on a phase synchronization detection method.

Supplement 7. An optical transmitter, including the apparatus as described in supplement 1.

Supplement 8. A bias control method of a modulator of an optical transmitter, the modulator of the optical transmitter including a first Mach-Zehnder modulator and a second Mach-Zehnder modulator, the method including:

performing mutual interference on a first driving signal of the first Mach-Zehnder modulator and a second driving signal of the second Mach-Zehnder modulator, so that output optical fields of the first Mach-Zehnder modulator and the second Mach-Zehnder modulator are correlated; and controlling a phase bias of the modulator of the optical transmitter according to an output power signal of the modulator of the optical transmitter.

Supplement 9. The method according to supplement 8, wherein the performing mutual interference on a first driving signal of the Mach-Zehnder modulator and a second driving signal of the second Mach-Zehnder modulator includes:

performing mutual interference by adding information on the second driving signal to the first driving signal via a loading signal and by adding information on the first driving signal to the second driving signal via the loading signal.

Supplement 10. The method according to supplement 9, wherein the performing mutual interference by adding information on the second driving signal to the first driving signal via a loading signal and by adding information on the first driving signal to the second driving signal via the loading signal includes:

multiplying the loading signal by the information on the second driving signal;

adding up a result of multiplication and the first driving signal to obtain a first driving signal performed mutual interference;

multiplying the loading signal by the information on the first driving signal; and adding up a result of multiplication and the second driving signal to obtain a second driving signal performed mutual interference.

Supplement 11. The method according to supplement 9, wherein the performing mutual interference by adding information on the second driving signal to the first driving signal via a loading signal and by adding information on the first driving signal to the second driving signal via the loading signal includes:

performing first shift operation on the second driving signal according to the loading signal;

adding up a result of the first shift operation and the first driving signal to obtain a first driving signal performed mutual interference;

performing second shift operation on the first driving signal according to the loading signal; and adding up a result of the second shift operation and the second driving signal to obtain a second driving signal performed mutual interference.

Supplement 12. The method according to supplement 9, wherein the information on the first driving signal and the information on the second driving signal are the first driving signal and the second driving signal, or symbols of the first driving signal and symbols of the second driving signal.

Supplement 13. The method according to supplement 8, wherein the controlling a phase bias of the modulator of the optical transmitter according to an output power signal of the modulator of the optical transmitter includes:

controlling the phase bias of the modulator of the optical transmitter according to the output power signal of the modulator of the optical transmitter and based on a peak value or mean square value detection method; or controlling the phase bias of the modulator of the optical transmitter according to the output power signal of the modulator of the optical transmitter and based on a phase synchronization detection method.

Although a few embodiments have been shown and described, it would be appreciated by those skilled in the art that changes may be made in these embodiments without departing from the principles and spirit thereof, the scope of which is defined in the claims and their equivalents.

What is claimed is:

1. A bias control apparatus of a modulator of an optical transmitter, the modulator of the optical transmitter including a first Mach-Zehnder modulator and a second Mach-Zehnder modulator, the bias control apparatus comprising:
a processor configured to perform mutual interference on a first driving signal of the first Mach-Zehnder modulator and a second driving signal of the second Mach-Zehnder modulator, and correlate output optical fields of the first Mach-Zehnder modulator and the second Mach-Zehnder modulator; and
a controller configured to control a phase bias of the modulator of the optical transmitter according to an output power signal of the modulator of the optical transmitter containing phase bias information,
wherein the processor is configured to:
perform mutual interference by adding information on the second driving signal to the first driving signal via a loading signal and by adding information on the first driving signal to the second driving signal via the loading signal,
execute a first multiplication to multiply the loading signal by the information on the second driving signal,
add results of the first multiplication executed and the first driving signal to obtain a first mutual interference performed driving signal,
multiply the loading signal by the information on the first driving signal, and
execute a second addition to add results of a second multiplication executed and the second driving signal to obtain a second mutual interference performed driving signal.

2. The bias control apparatus according to claim 1, wherein the information on the first driving signal and the information on the second driving signal are one of the first driving signal and the second driving signal, and symbols of the first driving signal and symbols of the second driving signal.

3. The bias control apparatus according to claim 1, wherein the controller comprises:
one of:
a first controller configured to control the phase bias of the modulator of the optical transmitter according to an output power signal of the modulator of the optical transmitter and based on one of a peak value and mean square value detection method; and
a second controller configured to control the phase bias of the modulator of the optical transmitter according to the output power signal of the modulator of the optical transmitter and based on a phase synchronization detection method.

4. An optical transmitter, comprising the bias control apparatus as claimed in claim 1.

5. A bias control apparatus of a modulator of an optical transmitter, the modulator of the optical transmitter including a first Mach-Zehnder modulator and a second Mach-Zehnder modulator, the bias control apparatus comprising:
a processor configured to perform mutual interference on a first driving signal of the first Mach-Zehnder modulator and a second driving signal of the second Mach-Zehnder modulator, and correlate output optical fields of the first Mach-Zehnder modulator and the second Mach-Zehnder modulator; and
a controller configured to control a phase bias of the modulator of the optical transmitter according to an output power signal of the modulator of the optical transmitter containing phase bias information,
wherein the processor is configured to:
perform mutual interference by adding information on the second driving signal to the first driving signal via a loading signal and by adding information on the first driving signal to the second driving signal via the loading signal,
perform a first shift operation on the second driving signal according to the loading signal,
add results of the first shift operation and the first driving signal to obtain a first mutual interference performed driving signal,
perform second shift operation on the first driving signal according to the loading signal, and
add results of the second shift operation and the second driving signal to obtain a second mutual interference performed driving signal.

6. The bias control apparatus according to claim 5, wherein the information on the first driving signal and the information on the second driving signal are one of the first driving signal and the second driving signal, and symbols of the first driving signal and symbols of the second driving signal.

7. The bias control apparatus according to claim 5, wherein the controller comprises:
one of:
a first controller configured to control the phase bias of the modulator of the optical transmitter according to an output power signal of the modulator of the optical transmitter and based on one of a peak value and mean square value detection method; and
a second controller configured to control the phase bias of the modulator of the optical transmitter according to the output power signal of the modulator of the optical transmitter and based on a phase synchronization detection method.

8. An optical transmitter, comprising the bias control apparatus as claimed in claim 5.

9. A bias control method of a modulator of an optical transmitter, the modulator of the optical transmitter including a first Mach-Zehnder modulator and a second Mach-Zehnder modulator, the bias control method comprising:
  performing mutual interference on a first driving signal of the first Mach-Zehnder modulator and a second driving signal of the second Mach-Zehnder modulator, and correlating output optical fields of the first Mach-Zehnder modulator and the second Mach-Zehnder modulator; and
  controlling a phase bias of the modulator of the optical transmitter according to an output power signal of the modulator of the optical transmitter containing phase bias information,
  wherein the performing mutual interference on a first driving signal of the Mach-Zehnder modulator and a second driving signal of the second Mach-Zehnder modulator comprises:
    performing mutual interference by adding information on the second driving signal to the first driving signal via a loading signal and by adding information on the first driving signal to the second driving signal via the loading signal which comprises:
      multiplying the loading signal by the information on the second driving signal,
      adding results of multiplication and the first driving signal to obtain a first mutual interference performed driving signal,
      multiplying the loading signal by the information on the first driving signal, and
      adding results of multiplication and the second driving signal to obtain a second mutual interference performed driving signal.

10. A non-transitory computer readable storage medium storing a method according to claim 9 for controlling a computer.

11. A bias control method of a modulator of an optical transmitter, the modulator of the optical transmitter comprising a first Mach-Zehnder modulator and a second Mach-Zehnder modulator, the method comprising:
  performing mutual interference on a first driving signal of the first Mach-Zehnder modulator and a second driving signal of the second Mach-Zehnder modulator, correlating output optical fields of the first Mach-Zehnder modulator and the second Mach-Zehnder modulator; and
  controlling a phase bias of the modulator of the optical transmitter according to an output power signal of the modulator of the optical transmitter containing phase bias information,
  wherein the performing mutual interference on a first driving signal of the Mach-Zehnder modulator and a second driving signal of the second Mach-Zehnder modulator comprises:
    performing mutual interference by adding information on the second driving signal to the first driving signal via a loading signal and by adding information on the first driving signal to the second driving signal via the loading signal which comprises:
      performing a first shift operation on the second driving signal according to the loading signal;
      adding results of the first shift operation and the first driving signal to obtain a first mutual interference performed driving signal;
      performing a second shift operation on the first driving signal according to the loading signal; and
      adding results of the second shift operation and the second driving signal to obtain a second mutual interference performed driving signal.

12. A non-transitory computer readable storage medium storing a method according to claim 11 for controlling a computer.

* * * * *